United States Patent [19]

Thoma et al.

[11] 4,035,213

[45] July 12, 1977

[54] SOFT TEXTILE COATINGS RESEMBLING NAPA LEATHER

[75] Inventors: Wilhelm Thoma, Bergisch-Neukirchen; Josef Pedain, Cologne; Jürgen Grammel, Dormagen, all of Germany; Antonio Aguado, Tarragona, Spain

[73] Assignee: Bayer Aktiengesellschaft, Leverkusen, Germany

[21] Appl. No.: 637,202

[22] Filed: Dec. 3, 1975

[30] Foreign Application Priority Data

Dec. 5, 1974  Germany .......................... 2457387

[51] Int. Cl.² ..................... D06N 3/14; B32B 27/40; B32B 27/42; B32B 27/12
[52] U.S. Cl. ............... 156/231; 156/238; 428/424; 428/904
[58] Field of Search ........... 156/231, 238; 428/423, 428/424, 904, 425

[56] References Cited

U.S. PATENT DOCUMENTS

| | | | |
|---|---|---|---|
| 3,398,042 | 8/1968 | Odenthal et al. | 428/424 |
| 3,650,880 | 3/1972 | Tieniber | 156/231 X |
| 3,844,862 | 10/1974 | Sauer et al. | 156/238 X |
| 3,900,688 | 8/1975 | Thoma et al. | 428/246 |
| 3,922,402 | 11/1975 | Shimamura et al. | 428/425 X |
| 3,939,021 | 2/1976 | Nishibayashi et al. | 428/904 X |
| 3,941,633 | 3/1976 | Wang et al. | 428/904 X |

*Primary Examiner*—James R. Hoffman
*Attorney, Agent, or Firm*—Gene Harsh; Lawrence S. Pope

[57] ABSTRACT

This invention relates to the coating of textile sheets with polyurethane pastes by the reversal process for producing very soft coating articles with a hand resembling that of napa leather. The particular properties of the coating are obtained by using bonding pastes which contain a mixture which can be cross-linked by the action of heat, consisting of polyurethane hydrazodicarbonamides and melamine-formaldehyde resins and/or urea-formaldehyde resins.

5 Claims, No Drawings

SOFT TEXTILE COATINGS RESEMBLING NAPA LEATHER

BACKGROUND OF THE INVENTION

It has been known in the art for some time to coat textiles, such as woven or knitted fabrics or non-woven bonded webs, with solutions or dispersions of polyurethanes by the direct or reversal process. The articles obtained are used for the manufacture of outerwear garments, upholstery, bags, suitcases, shoe upper material, tarpaulins, awnings and many other products.

In contrast to two-component polyurethanes, which have been known quite a long time, the so-called "one-component polyurethanes" have been more recently introduced into the art. These products are obtained by reacting mixtures of polyhydroxyl compounds, in practice mainly dihydroxypolyesters or dihydroxypolyethers, and glycols, preferably ethylene glycol or butane-1,4-diol, with aromatic diisocyanates, preferably diphenylmethane-4,4'-diisocyanates. These polyurethanes, which are substantially linear and can be prepared both in solution and in solvent-free melts, can be dissolved only in solvent mixtures which contain dimethylformamide or other highly polar compounds, such as dimethylacetamide or N-methyl-pyrrolidone, in proportions of from 20 to 60%, based on the total quantity of solvent. Solutions of the one-component polyurethanes have a practically unlimited pot-life.

The process of film formation of these one-component polyurethanes have a practically unlimited pot-life.

The process film formation of these one-component polyurethanes is a purely physical process which, in contrast to that of two component polyurethanes, is not accompanied by any chemical reaction.

Not only the use of glycols, such as butane diol, as chain lengthening agents for the preparation of one-component polyurethanes, but also the use of diolurethanes, diolamides and diolureas for the formation of the hard segments in polyurethanes is already known in the art (DOS No. 1,544,864).

Furthermore, segmented polyurethane elastomers are prepared from aromatic isocyanate prepolymers and aromatic or aliphatic diamines, bis-hydrazides, bis-semicarbizides, bis-carbazic acid esters and hydrazine hydrate as chain lengthening agents. In addition to the so-called "aromatic one-component polyurethanes", which are prepared from aromatic diisocyanates, the so-called "aliphatic one-component polyurethanes" are also already known in the art. These are polyurethane ureas obtained from higher molecular weight dihydroxy compounds, aliphatic diisocyanates and aliphatic diamines as chain lengthening agents.

One-component polyurethanes obtained from dihydroxypolyesters and/or dihydroxypolyethers, aromatic diisocyanates, diols and/or aromatic diamines and/or bis-hydrazides are used for the preparation of top coats and bonding coats by the reversal process in the form of from 20 to 40% solutions in solvent mixtures which always contain high proportions of dimethylformamide. One-component polyurethanes based on aliphatic diisocyanates and aliphatic diamines are applied from solvent mixtures which contain secondary or primary alcohols in addition to aromatic hydrocarbons.

The aromatic and aliphatic one-component polyurethanes are distinguished, among other things, by their high mechanical strength, high elongation, low abrasion loss and high folding strength. They are also characterised by the relatively high microhardness of films produced from the polyurethane solutions or dispersions (Shore A hardness 60–95) and the relatively high modulus values (100% modulus values are generally from 25 to 150 kp/cm$^2$).

Textile coatings produced using such polyurethanes as bonding coat do not have the extremely soft napa-like hand which can be obtained by using the bonding pastes according to the invention.

SUMMARY OF THE INVENTION

This invention relates to a process for the production of textile coatings which have an exceptionally soft hand resembling that of napa leather by the application of a polyurethane paste containing melamine-formaldehyde resins and/or urea-formaldehyde resins as bonding coat and another polyurethane paste as top coat to textile supports in the form of webs by the reversal process, followed by evaporation of the solvent or dispersing agent accompanied by acid catalysed cross-linking of the components of the bonding coat, characterised in that the pastes used as bonding coat have a solids content of from 30 to 70%, by weight, composed of the following components:

100 parts, by weight, of a polyurethane from:
1. a prepolymer from:
   a. dihydroxy polyesters or polyethers; and
   b. aliphatic and/or cycloaliphatic diisocyanates in which the proportion of cycloaliphatic diisocyanates is at least 25 mols %, the equivalent ratio of (b)/(a) being from 1.4 to 2.5; and
2. hydrazine as chain lengthening agent; and from 1 to 10 parts, by weight, of a melamine-formaldehyde resin and/or a urea-formaldehyde resin;

and that self-supporting sheets produced from the bonding pastes have microhardnesses (Shore A) ≦ 50 and moduli (at 100%) of ≦ 15 kp/cm$^2$.

The components contained in the bonding pastes used according to the invention are reacted together and at the same time cross-linked in the coating process by heating them under acid catalysed conditions, preferably to temperatures of from 120° to 160° C and most preferably from 140° to 150° C, and at the same time evaporating off the solvent or dispersing agent.

The solids concentration of the bonding pastes is from 70 to 30% and preferably from 40 to 60%. The proportion, by weight, of melamine-formaldehyde resin and/or urea-formaldehyde resin to polyurethane urea and polyurethane hydrazodicarbonamide is from 1 : 100 to 10 : 100, preferably from 4 : 100 to 6 : 100. Both organic solvents and water may be used as solvents or dispersing agents.

The amount of dimethylformamide in the solvent (mixture) of the bonding pastes may be from 0% to 100% and is preferably from 40% to 60%.

DETAILED DESCRIPTION OF THE INVENTION

The bonding pastes to be used according to the invention result in coated articles which have an exceptionally soft hand resembling that of napa leather, and the polyurethane films produced from the bonding pastes are distinguished by their low microhardness (Shore A hardness at the most 50) and low 100% modulus values (less than 15 kp/cm$^2$). These properties are unexpected since polyurethane elastomers produced from aromatic isocyanate prepolymers and hydrazine hydrate of the type used, for example, in elastic polyurethane fibres of the Spandex-type have relatively high values for microhardness and modulus values at 100% elongation.

Polyurethane elastomers produced from aliphatic isocyanate prepolymers and diamines as chain lengthening agents in the hard segments also have a substantially higher microhardness and high 100% modulus values compared with the corresponding values of the bonding coats used according to the invention. Numerical comparisons may be found in the Examples.

The bonding coat solutions according to the invention are prepared as follows:

An isocyanate prepolymer is first prepared from dihydroxypolyethers and/or dihydroxypolyesters and aliphatic and/or cycloaliphatic diisocyanates (preferably containing from 6 to 15 carbon atoms), such as butane-1,4-diisocyanate, hexane-1,6-diisocyanate, cyclohexane-1,3-diisocyanate and/or 1,4-diisocyanate, 3,3,5-trimethyl-5-isocyanatomethyl-cyclohexylisocyanate (isophorone diisocyanate), dicyclohexylmethane-4,4'-diisocyanate and hexahydrotolyene-2,4-or-2,6-diisocyanate. The NCO/OH ratio is maintained at from 1.4 to 2.5 and preferably from 1.8 to 2.1. The isocyanate component used is preferably a mixture of hexane-1,6-diisocyanate and isophorone diisocyanate (molar ratio from 1 : 3 to 3 : 1).

The prepolymer is then converted into the polyurethane hydrazodicarbonamide elastomer by reacting it in solution with hydrazine hydrate (preferably from 50 to 100% hydrate content) or with the reaction product of hydrazine hydrate and carbon dioxide.

The most suitable dihydroxypolyesters and/or dihydroxypolyethers are those with molecular weights of from 600 to 4000 and particularly from 1800 to 1300.

The dihydroxypolyesters are prepared in known manner from one or more dicarboxylic acids which preferably contain at least 6 carbon atoms and one or more dihydric alcohols.

Instead of free polycarboxylic acids, the corresponding polycarboxylic acid anhydrides or esters of lower alcohols or mixtures thereof may be used for preparing the polyesters. The polycarboxylic acids may be aliphatic, cycloaliphatic, aromatic and/or heterocyclic and they may be substituted, e.g., with halogen atoms, and/or be unsaturated. The following are examples: succinic acid, pimelic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid anhydride, fumaric acid, dimeric and trimeric fatty acids, such as oleic acid, optionally as mixtures with monomeric fatty acids, dimethylterephthalate or bis-glycol terephthalate.

Aliphatic dicarboxylic acids are preferred, and particularly adipic acid. Examples of suitable dihydric alcohols include; ethylene glycol, propylene-1,2-glycol and 1,3-glycol, butylene-1,4-glycol, -2,3-glycol and 1,3-glycol, hexane-1,6-diol, octane-1,8-diol, neopentyl glycol, 1,4-bis-hydroxymethyl-cyclohexane, 2-methyl-propane-1,3-diol, diethylene glycol, triethylene glycol, tetraethylene glycol, higher polyethylene glycols, dipropylene glycol, polypropylene glycols, dibutylene glycol and polybutylene glycols. Particularly preferred for the purpose of the invention are ethylene glycol, diethylene glycol, butylene-1,4-glycol and mixtures of these dihydric alcohols. Apart from Polyesters of the type described above, polycondensation products of straight-chain hydroxyalkane monocarboxylic acids containing at least 5 carbon atoms, e.g. ε-hydroxycaproic acid, or the corresponding lactone polymers, may also be used according to the invention.

Suitable polyethers containing two hydroxyl groups are also already known and may be prepared, for example, by the polymerisation of epoxides, such as ethylene oxide, propylene oxide, butylene oxide, tetrahydrofuran, styrene oxide or epichlorohydrin, either each on its own, e.g., in the presence of $BF_3$, or by addition of these epoxides, optionally as mixtures or successively, to starting components which contain reactive hydrogen atoms, such as water, alcohols or amines, e.g. ethylene glycol, propylene-1,2-glycol or -1,3-glycol, 4,4'-dihydroxy-diphenylpropane, aniline, ethanolamine or ethylene diamine.

Dihydroxybutylene glycol polyethers and dihydroxy propylene glycol polyethers are particularly preferred.

Dihydroxyl compounds which have been prepared by preliminary chain lengthening or relatively low molecular weight dihydroxypolyesters or dihydroxypolyethers (molecular weight from 500 to 1200) with any aliphatic, cycloaliphatic or aromatic diisocyanates, preferably tolylene diisocyanate, using an NCO/OH ratio of from 1:2 to 2:3 may also be used for synthesising the isocyanate prepolymers. It has been found that the incorporation of such aromatic urethane groups has no deleterious effect on the hand and mechanical properties of the bonding coat.

In addition to polyureas, the bonding pastes according to the invention contain commercial reaction products of melamine or urea and formaldehyde or formaldehyde derivatives, which can be prepared in known manner.

The combination of these known formaldehyde resins with polyurethanes or cycloaliphatic and if desired also aliphatic isocyanates, dihydroxypolyesters or dihydroxypolyethers (preferably polyesters from adipic acid and ethylene glycol and/or butane-1,4-diol and/or diethylene glycol or dihydroxypolybutylene glycol or dihydroxypolypropylene glycol having a molecular weight of from 1800 or 3000) and hydrazine, as chain lengthening agent, is surprisingly found to result in bonding coats which have the desired mechanical properties (microhardness according to Shore A $\leq$ 50 and modulus of 100% elongation $\leq$ 15 kp/cm$^2$) and a napa-like hand if the quantitative proportions indicated above are observed.

As mentioned above, the bonding pastes preferably contain from 40 to 60% by weight, of dimethylformamide. The following solvents may be used in addition: dimethylacetamide, N-methylpyrrolidone, tetrahydrofuran, dioxane, methyl ethyl ketone, acetone, diethyl ketone, methyl isobutyl ketone, toluene, xylene, methyl glycol acetate, ethyl glycol acetate, butyl acetate, ethyl acetate, methyl acetate, methanol, ethanol, isopropanol, ethylene glycol monomethyl ether, ethylene glycol monoethyl ether, butanols, diacetone alcohol, cyclohexanone, water and others. A preferred mixture consists of 40% of dimethylformamide, 30% of toluene, 20% of isopropanol and 10% of ethylene glycol monoethyl ether.

Acid catalysts are used for cross-linking the polyurethane hydrazodicarbonamide used according to the invention with formaldehyde resins, for example maleic acid, p-toluene-sulphonic acid or mono-ammonium phosphate. They may be used in a buffered form together with bases, such as ammonia, triethylamine, triethanolamine, N-methylmorpholine and morpholine.

The polyurethanes in the top coat solutions are so-called "aromatic polyurethanes" or "aliphatic polyurethanes" which are synthesised in known manner from polyisocyanates, higher molecular weight dihydroxypolyesters and/or polyethers and low molecular weight chain lengthening agents. These polyurethanes can be prepared by known methods, either solvent-free or in solution and either by the one-shot process or by way of a prepolymer.

The dihydroxypolyesters and/or dihydroxypolyethers used in this case also preferably have molecular weights of from 600 to 4000 and most preferably from 800 to 2500.

The polyesters and polyethers used may, for example, be the same as those mentioned above for the preparation of the bonding coat solutions.

Other starting components to be used include: aliphatic, cycloaliphatic, araliphatic aromatic and heterocyclic polyisocyanates, such as those described, e.g., by W. Siefken in Justus Liebigs Annalen der Chemie, 562, pages 75 to 136, for example, ethylene diisocyanate, tetramethylene-1,4-diisocyanate, hexamethylene-1,6-diisocyanate, dodecane-1,12-diisocyanate, cyclobutane-1,3-diisocyanate, cyclohexane-1,3-and -1,4-diisocyanate and mixtures of these isomers, 1-methyl-2,6-diisocyanatocyclohexane, 1-methyl-2,4-diisocyanatocyclohexane, 1-isocyanato-3,3,5-trimethyl-5-isocyanatomethyl-cyclohexane, hexahydrotolylene-2,4- and -2,6-diisocyanate and mixtures of these isomers, hexahydrophenylene-1,3-and/or -1,4-diisocyanate, perhydrodiphenylmethane-2,4'- and/or 4,4'-diisocyanate, phenyl-1,3- and -1,4-diisocyanate, tolylene -2,4- and -2,6-diisocyanate and mixtures of these isomers, diphenylmethane-2,4'- and/or -4,4'-diisocyanate, naphthylene-1,5-diisocyanate, 4,4'-diphenyl-dimethylmethane-diisocyanate or mixtures of these compounds. 4,4'-diphenylmethane diisocyanate is particularly suitable.

The low molecular weight diol components used as chain lengthening agents for the preparation of the polyurethanes used as top coats preferably have molecular weights of from 62 to 450. Various types of diol compounds may be used according to the invention, for example the following:

a. Alkanediols, such as ethylene glycol, propylene-1,3-glycol and propylene-1,2-glycol, butane-1,4-diol, pentane-1,5-diol, dimethylpropane-1,3-diol and hexane-1,6-diol;

b. Ether diols, such as diethylene glycol, triethylene glycol or phenylene-1,4-bis-($\beta$-hydroxyethylether);

c. Aminodiols, such as N-methyldiethanolamine or N-methyl-dipropanolamine;

d. Ester diols corresponding to the following general formulae:

HO—(CH$_2$)$_x$—CO—O—(CH$_2$)$_y$—OH and

HO—(CH$_2$)$_x$—O—CO—R—CO—O—(CH$_2$)$_x$—OH wherein
R represents an alkylene or arylene group containing from 1 to 10, preferably from 2 to 6 carbon atoms;
$x = 2$–$6$; and
$y = 3$–$5$;

e.g., $\delta$-hydroxybutyl-$\epsilon$-hydroxy-caproic acid ester, $\omega$-hydroxyhexyl-$\gamma$-hydroxybutyric acid ester, adipic acid-($\beta$-hydroxyethyl) ester and terephthalic acid bis-($\beta$-hydroxyethyl) ester;

e. Diol urethanes corresponding to the following general formula:

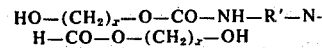

wherein
R' represents an alkylene, cycloalkylene or arylene group containing from 2 to 15, preferably from 2 to 6 carbon atoms; and
$x$ represents a number of from 2 to 6; e.g., 1,6-hexamethylene-bis-($\beta$-hydroxyethylurethane) or 4,4'-diphenylmethane-bis-($\delta$-hydroxybutylurethane);

f. Diol ureas corresponding to the following general formula

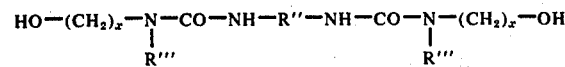

wherein
R'' represents an alkylene, cycloalkylene or arylene group containing from 2 to 15 and preferably from 2 to 9 carbon atoms;
R''' represents H or CH$_3$; and
$x = 2$ or 3; e.g.
4,4'-diphenylmethane-bis-($\beta$-hydroxyethylurea), or the compound

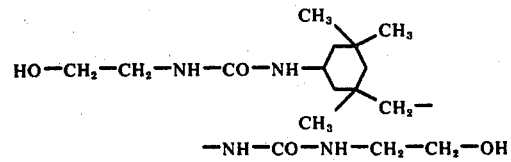

The following are examples of aliphatic diamines which may be used as chain lengthening agents either alone or as mixtures; ethylene diamine, propylene-1,2- and 1,3-diamine, tetramethylene-1,4-diamine, hexamethylene-1,6-diamine, N,N'-diisobutyl-1,6-hexamethylene diamine, 1,11-undecamethylene diamine, cyclohexane-1,3- and -1,4-diamine and mixtures thereof, 1-amino-3,3,5-trimethyl-5-aminomethylcyclohexane, hexahydrotolylene-2,4-diamine and -2,6-diamine and mixtures thereof, perhydro-2,4'- and -4,4'-diaminodiphenylmethane, p-xylylenediamine and bis(3-aminopropyl-methylamine).

Hydrazine and substituted hydrazines such as methylhydrazine, N,N'-dimethylhydrazine and their homologues, as well as acid dihydrazides may also be used according to the invention, e.g., carbodihydrazide, oxalic acid dihydrazide, the dihydrazides of malonic acid, succinic acid, glutaric acid, adipic acid, $\beta$-methyladipic acid, sebacic acid, hydracrylic acid and terephthalic acid, semi-carbazidoalkylene hydrazides, such as $\beta$-semicarbazido-propionic acid hydrazine (DOS No. 1,770,591), semicarbazido-alkylene-carbazic esters, such as 2-semi-carbazidoethyl-carbazic ester (DOS No. 1,918,504), or also amino-semi-carbazide compounds such as $\beta$-aminoethylsemi-carbazido-carbonate (DOS No. 1,902,931).

Examples of suitable aromatic diamines include: bis-anthranilic acid esters according to German Offenlegungsschrift Nos. 2,040,644 and 2,160,590, 3,5- and 2,4-diaminobenzoic acid esters according to DOS No. 2,025,900, the diamines with ester described in German Offenlegungschrift Nos. 1,803,635; 2,040,650 and 2,160,589, and 3,3'-dichloro-4,4'-diaminodiphenylmethane, tolylene diamine, 4,4'-diaminodiphenylmethane and 4,4'-diaminodiphenyl disulphide.

Pigments, fillers and other auxiliary agents, such as stabilizers against hydrolysis, UV stabilizers, antioxidants and polysiloxanes, may be added to the top coat and bonding coat pastes in the usual manner.

The hand of coated articles produced from known polyurethane top coats and the bonding coats used according to the invention are assessed in the Examples. The values for microhardness and 100% modulus of films produced from the bonding coat pastes are also compared.

The figures given represent parts or percentages by weight unless otherwise indicated.

General method of coating procedure:

The top coating solution is spread on a release paper by means of a doctor roll coater on a spread coating machine. The quantity applied each time corresponds to 120 g of paste per m$^2$. After the first passage through the drying channel, which has an air temperature of 100° C at the inlet and 140° C at the outlet, the bonding coat paste is applied in analogous manner in a thickness corresponding 120 g/m$^2$, either in a second spreading machine or after return of the coated release paper. The textile web, consisting of a napped cotton duvetyn weighing 240 g per m$^2$, is then applied, and the solvent mixture of the bonding coat is evaporated off in the drying channel.

On leaving the drying channel, the release paper and coated web of fabric are rolled up independently of each other.

EXAMPLE 1

The top coat paste D 1 is a 35% solution of a polycarbonate polyester urethane is dimethylformamide/MEK (3:2) which has a viscosity of 10,000 cP at 25° C. The polycarbonate polyester urethane was prepared by solvent-free condensation of 1000 g (0.5 mol) of hexanediol polycarbonate, 1125 g (0.5 mol) of a butane-1,4-diol adipate, 270 g of butane-1, 4-diol (3.0 mol) and the equivalent quantity of 4,4'-diphenylmethanediisocyanate (100 g). The coating paste contains 10% of a commercial pigment paste.

Bonding coat paste H 1 is an approximately 50% solution composed of:
  1000 g of a 50% solution of polyester urethane and hydrazodicarbonamide,
  50 g of an approximately 50% solution of a commercial melamine-formaldehyde resin in butanol and
  5.0 g of a 20% solution of p-toluenesulphonic acid in isopropanol.

To prepare the 50% solution of polyesterurethane hydrazodicarbonamide, 2550 g (1.0 mol) of a polyester from diethylene glycol and adipic acid (OH number 44) were reacted solvent-free with 333 g (1.5 mol) of 3,3,5-trimethyl-5-isocyanatomethylcyclohexylisocyanate and 84 g (0.5 mol) of hexane-1,6-diisocyanate at 100° C to produce an NCO-prepolymer. The solvent-free melt was dissolved in 1203 g of dimethylformamide and 896 g of toluene and reacted with a solution of 50.0 g (1.0 mol) of hydrazine hydrate in 601 g of isopropanol and 301 g of ethylene glycol under conditions of cooling to produce the polyester urethane hydrazo dicarbonamide. The viscosity of the solution is 40,000 cP/25° C.

Bonding coat paste H 2 (comparison experiment) is an approximately 50% solution composed of:
  1000 g of a 50% solution of polyester urethane urea,
  50 g of an approximately 50% solution of a melamine formaldehyde resin in n-butanol and
  5.0 g of a 20% solution of p-toluenesulphonic acid in isopropanol.

To prepare the 50% solution of polyesterurethane urea, 2967 g of the isocyanate prepolymer described for the preparation of bonding coat paste H 1 were dissolved in 1260 g of dimethylformamide and 940 g of toluene and reacted with a solution of 170 g (1.0 mol) of 3,3,5-trimethyl-5-aminomethylcyclohexylamine in 624 g of isopropanol and 315 g of ethyl glycol under conditions of cooling to produce the polyester urethane urea. The viscosity of the solution is 40,000 cP/25° C. Bonding coat paste H 2 is also adjusted to a suitable spread coating viscosity of about 15,000 cP/25° C with dimethylformamide.

Bonding coat paste H 3 (comparison experiment) is a 30% solution of an aromatic polyester urethane hydrazoldicarbonamide which was prepared as follows:

2550 g (1.0 mol) of the diethyleneglycol adipate used for H 1 are reacted with 500 g (2.0 mol) of 4,4'-diphenylmethane diisocyanate in 783 g of toluene at 100° C to produce an NCO prepolymer solution. After dilution of this solution with 6000 g of dimethylformamide, 50 g (1.0 mol) of hydrazine hydrate in 430 g of dimethylformamide are added dropwise with cooling and vigorous stirring in the course of about 30 minutes. The approximately 30% solution obtained has a viscosity of about 25,000 cP/25° C.

| Coating component | Hand | Microhardness Shore A | 100% modulus kg/cm$^2$ (DIN 53 504) |
|---|---|---|---|
| D 1/H 1 | Very soft, resembling napa leather | 50 | 10–13 |
| D 1/H 2 (comparison) | Distinctly harder than D 1/H 1 | 65 | 15–20 |
| D 1/H 3 (comparison) | Hard to rigid | 80 | 70–80 |

EXAMPLE 2

Top coat paste D 2 is a 30% solution of a segmented polycarbonate-polyurethaneurea elastomer in xylene/isopropanol/ ethyl glycol having a viscosity of 30,000 cP at 25° C. The polyurethane was prepared by the prepolymer process from 730 g of hexanediol polycarbonate (molecular weight 2000), 180 g of 1-isocyanate-3-isocyanatomethyl-3,5,5-trimethyl-cyclohexane and 90 g of 4,4'-diamino-dicyclohexylmethane. The NCO prepolymer which was prepared solvent-free from hexanediol polycarbonate and 1-isocyanato-3-isocyanatomethyl-3,5,5-trimethylcyclohexane was dissolved in toluene and reacted with the diamine solution in isopropanol/ethyl glycol to produce the polyurethane urea. 10% of a commercial pigment paste is added to the solution.

Bonding coat past H 4 is an approximately 50% solution composed of:

1000 g of a 50% solution of polyesterurethane hydrazodicarbonamide, 50 g of an approximately 50% solution in n-butanol of a commercial melamine-formaldehyde resin and 50 g of a 20% solution in isopropanol of p-toluenesulphonic acid.

To prepare the 50% polyester urethane hydrazodicarbonamide solution, 2000 g (1.0 mol) of a diethyleneglycol adipate with OH number 56 were reacted solvent-free with 289 g (1.3 mol) of 1-isocyanato-3-isocyanato-methyl-3,5,5-trimethylcyclohexane and 67 g (0.4 mol) of hexane-1,6-diisocyanate at 100° C to produce an NCO prepolymer. The solvent-free melt was dissolved in 1035 g of toluene and reacted with 35.0 g (0.70 mol) of hydrazine hydrate in 830 g of isopropanol and 475 g of ethyl glycol under conditions of cooling to produce the polyester urethane hydrazodicarbonamide. The viscosity of the solution is 42,000 cP/25° C. Bonding coat paste H 4 is adjusted to a suitable spread coating viscosity of about 15,000 cP/25° C with toluene for laminating the textile web.

Bonding coat paste H 5 (com parison) is an approximately 50% solution composed of:

1000 g of a 50% solution of polyester urethane urea, 50 g of an approximately 50% solution of a melamine-formaldehyde resin in n-butanol and 5.0 g of a 20% solution of p-toluenesulphonic acid in isopropanol.

To prepare the 50% solution of polyester urethane urea, 2356 g of the prepolymer mentioned for the preparation of bonding coat paste H 4 were dissolved in 1120 g of toluene and reacted with a solution of 119 g (0.70 mol) of 3,3,5-trimethyl-5-aminomethylcyclohexylamine in 865 g of isopropanol and 490 g of ethyl glycol under conditions of cooling to produce the polyester urethane urea. The viscosity of the solution is 40,000 cP/25° C. For laminating the textile web, the viscosity is adjusted to 15,000 cP/25° C with toluene.

| Components of the coating | Hand | Microhardness Shore A | 100% modulus kp/cm² |
|---|---|---|---|
| D 2/H 4 | Very soft and pleasant, resembling nappa leather | 45-50 | 10-12 |
| D 2/H 5 (comparison) | Substantially harder and less pleasant than D 2/H 4 | 60 | 15-20 |

EXAMPLE 3

Top coating paste D 1 is used for producing the top coat.

Bonding coat paste H 6 is an approximately 50% solution composed of: 1000 g of a 50% solution of polyether urethane hydrazocarbonamide, 50 g of an approximately 50% solution of a melamine-formaldehyde resin in n-butanol and 5.0 g of a 20% solution of p-toluenesulphonic acid in isopropanol.

To prepare the 50% solution of polyether urethane hydrazodicarbonamide, 3000 g (3.0 mol) of a dihydroxypolypropylene glycol ether (OH number 112) and 348 g (2.0 mol) of an isomeric mixture of 2,4- and 2,6-diisocyanatotoluene (65/35) were reacted solvent free at 100° C. The dihydroxypolyether urethane was then reacted with 333 g of 1-isocyanato-3-isocyanatomethyl-3,5,5-trimethylcyclohexane (1.5 mol) and 84 g of hexane-1,6-diisocyanate (0.5 mol) at 100° C to produce the NCO prepolymer which was then dissolved in 1520 g of dimethylformamide and 1140 g of toluene and reacted with a solution of 50 g (1.0 mol) of hydrazine hydrate in 760 g of isopropanol and 380 g of ethyl glycol. The viscosity of the 50% solution is 30,000 cP/25° C. For laminating the textile web, the solution is adjusted to a spread coating viscosity of about 15,000 cP/25° C with dimethyl formamide.

Bonding coat paste H 7 (comparison) is an approximately 50% solution of 1000 g of a 50% solution of a polyether urethane urea, 50 g of an approximately 50% solution of a melamine-formaldehyde resin in n-butanol and 5.0 g of a 20% solution of p-toluenesulphonic acid in isopropanol.

To prepare the approximately 50% solution of polyether urethane urea, 3765 g of the NCO prepolymer mentioned for the preparation of bonding coat solution H 6 were dissolved in 1585 g of dimethylformamide and 1175 g of toluene and reacted with a solution of 170 g of 1-amino-3-aminomethyl-3,5,5-trimethylcyclohexane (1.0 mol) in 785 g of isopropanol and 395 g of ethyl glycol. Viscosity of the solution: 35,000 cP/25° C./

| Coating components | Hand | Microhardness Shore A | 100% modulus kp/cm² |
|---|---|---|---|
| D 1/H 6 | Very soft, resembling napa leather | 45 | 5-10 |
| D 1/H 7 (comparison) | Substantially harder and less pleasant than D 1/H 6 | 60 | 20-30 |

EXAMPLE 4

Top coating paste D 1 is used to produce the top coat.

Bonding coat paste H 8 is an approximately 50% solution composed of: 1000 g of a 50% solution of polyester urethane hydrazodicarbonamide, 50 g of an approximately 50% solution of a commercial melamine-formaldehyde resin in n-butanol, and 5.0 g of a 20% solution of p-toluenesulphonic acid in isopropanol.

To prepare the 50% solution of polyester urethane hydrazodicarbonamide, 2070 g (1.0 mol) of a polyester of triethylene glycol/hexane-1,6-diol (molar ratio 2:1) and adipic acid (OH number 54) were reacted with 333 g (1.5 mol) of isophorone diisocyanate and 84 g (0.5 mol) of hexamethylene-1,6-diisocyanate at 100° C to produce an isocyanate prepolymer which was then dissolved in 1000 g of dimethylformamide and 750 g of toluene and chain lengthened with a solution of 50 g (1.0 mol) of hydrazine hydrate in 500 g of isopropanol and 250 g of ethyl glycol.The viscosity of the 50% solution is 40,000 cP/25° C. For laminating the textile web, the paste is adjusted to a spread coating velocity of about 15000 cP/25° C with dimethylformamide.

| Coating components | Hand | Microhardness Shore A | 100% modulus kp/cm² |
|---|---|---|---|
| D 1/H 8 | Very soft, resembling napa leather | 30 | 5 |

EXAMPLE 5

Top coating paste D 1 is used to produce the top coat.

Bonding coat paste H 9 has the following composition:
- 1000 g of a 50% solution of polyesterurethane-hydrazodicarbonamide,
- 50 g of an approximately 50% solution of a commercial melamine-formaldehyde resin in n-butanol,
- 5.0 g of a 20% solution of p-toluene sulphonic acid in isopropanol.

To prepare the 50% solution of polyester urethane hydrazodicarbonamide, 2000 g (1.0 mol) of a polyester from butylene glycol-1,4,ethylene glycol, diethylene glycol (molar ratio 2.2:1.9:1.2) and adipic acid (OH number 56) were reacted with 333 g (1.5 mol) of isophorone diisocyanate and 84 g (0.5 mol) of hexamethylene-1,6-diisocyanate at 100° C to produce the isocyanate prepolymer which was then dissolved in 980 g of dimethylformamide and 735 g of toluene and chain lengthened with a solution of 50 g (1.0 mol) of hydrazine hydrate in 490 g of isopropanol and 215 g of ethyl glycol. The viscosity of the 50% solution is 42,000 cP/25° C. For laminating the textile web, the coating paste is adjusted to a viscosity of about 10,000 cP/25° C with dimethylformamide.

| Coating component | Hand | Microhardness Shore A | 100% modulus kp/cm |
|---|---|---|---|
| D 1/H 9 | Very soft, resembling napa leather | 30 | 5 |

We claim:

1. Process for the production of textile coatings which have an exceptionally soft hand resembling that of napa leather by applying a polurethane paste which contains melamine formaldehyde resins and/or urea-formaldehyde resins as a bonding coat and another polyurethane paste as top coat to textile supports in the form of webs by the reversal process followed by evaporation of the solvent or dispersing agent and simultaneous acid catalysed cross-linking of the components of the bonding coat, characterised in that the bonding coats used are pastes with a solids content of from 30 to 70%, by weight, consisting of: 100 parts, by weight, of a polyurethane from
   1. a prepolymer from
      a. dihydroxy polyesters or dihydroxy polyethers; and
      b. aliphatic and/or cycloaliphatic diisocyanates with a proportion of cycloaliphatic diisocyanates of at least 25 mol %;
   the equivalent ratio of (b)/(a) being from 1.4 to 2.5; and
   2. hydrazine as chain lengthening agent; and from 1 to 10 parts, by weight, of a melamine-formaldehyde resin and/or a urea-formaldehyde resin; and that self supporting sheets produced from the bonding coat pastes have microhardness (Shore A) $\leq$ 50 and moduli (at 100%) $\leq$ 15 kp/cm$^2$.

2. Process according to claim 1, characterised in that the bonding coat pastes contain from 4 to 6 parts by weight, of formaldehyde resin to 100 parts, by weight, of polyurethane.

3. Process according to claim 1, characterised in that dihydroxypolyesters from adipic acid, and diols selected from the group consisting of ethylene glycol, diethylene glycol and butane-1,4-diol having a molecular weight of from 1800 to 3000 are used for synthesising the polyurethane of the bonding coat paste.

4. Process according to claim 1, characterised in that dihydroxybutylene glycol polyethers or dihydroxypropylene glycol polyethers having a molecular weight of from 1800 to 3000 are used for synthesising the polyurethane of the bonding coat paste.

5. Process according to claim 1, characterised in that a mixture of hexane-1,6-diisocyanate and 1-isocyanato-3,3,5-trimethyl-5-isocyanatomethylcyclohexane is used in a molar ratio of from 1 : 3 to 3 : 1 for synthesising the polyurethane of the bonding coat paste.

* * * * *